Nov. 3, 1942.  M. E. TORPEY  2,300,819
MACHINE FOR CUTTING A CAKE OF ICE INTO SMALL BLOCKS
Filed March 15, 1941  2 Sheets-Sheet 1

Inventor
MAURICE E. TORPEY
By Clayton L. Jenks
Attorney

Nov. 3, 1942.　　　　M. E. TORPEY　　　　2,300,819
MACHINE FOR CUTTING A CAKE OF ICE INTO SMALL BLOCKS
Filed March 15, 1941　　　2 Sheets-Sheet 2

Inventor
MAURICE E. TORPEY
By Clayton L. Jenks
Attorney

Patented Nov. 3, 1942

2,300,819

UNITED STATES PATENT OFFICE 2,300,819

MACHINE FOR CUTTING CAKES OF ICE INTO SMALL BLOCKS

Maurice E. Torpey, Worcester, Mass.

Application March 15, 1941, Serial No. 383,493

3 Claims. (Cl. 143—38)

This invention relates to a machine for cutting a cake of ice into small blocks, and more particularly to a machine having saws arranged for cutting two sets of grooves in the bottom of an ice cake and then by means of a third saw severing the blocks from the cake.

Various types of ice cutting machine have been proposed which require manually positioning and turning the ice cake for each of the successive cuts and with an attendant waste of time and effort. Many such machines require that the ice cake pass the grooving saws twice, once for the cut and then again to return the cake to its initial position for another cutting operation. This wastes time, and it requires careful handling of the ice cake in both directions of passage. It has also been proposed to employ a combination rotating and sliding frame arranged to feed an article to be cut through the successive stages required for cutting the blocks, but this type of structure has been complicated and expensive to build and operate or inefficient because of the slowness of operation required for feeding the cake forward and positioning it for each successive cutting stage. It is desirable that the fragile or brittle ice cake be fed forward in such a manner that imperfections in its shape will not materially affect the cutting operation and will permit the cake to be turned automatically and presented properly for the next succeeding step in its travel.

The primary object of this invention is to provide a machine for cutting a large cake of ice into small blocks which overcomes such problems and is simple in structure and economical in its manufacture and use, and which will operate efficiently and rapidly and with a minimum of manual effort for controlling the travel of the ice cake and forming the ice blocks. Further objects will be apparent in the following disclosure.

In accordance with this invention, I have provided a machine having two spaced sets of saws for cutting parallel scarfs or grooves in the underside of a cake of ice as it is traversed thereover in a straight line path. The cake is automatically turned through substantially 90° between the two cutting operations so that these cuts will intersect. A further saw is provided for cutting horizontally into the cake and thus severing the blocks therefrom. The automatic feeding mechanism comprises a turntable having an open guide frame fixed thereon and arranged to slide a cake over a stationary bed plate or table in a substantially circular path, which cooperates with guiding rails and pressure devices for moving the ice cake in a straight path for the two successive grooving operations.

Referring to the drawings, which illustrate a preferred embodiment of this invention:

Figure 1:
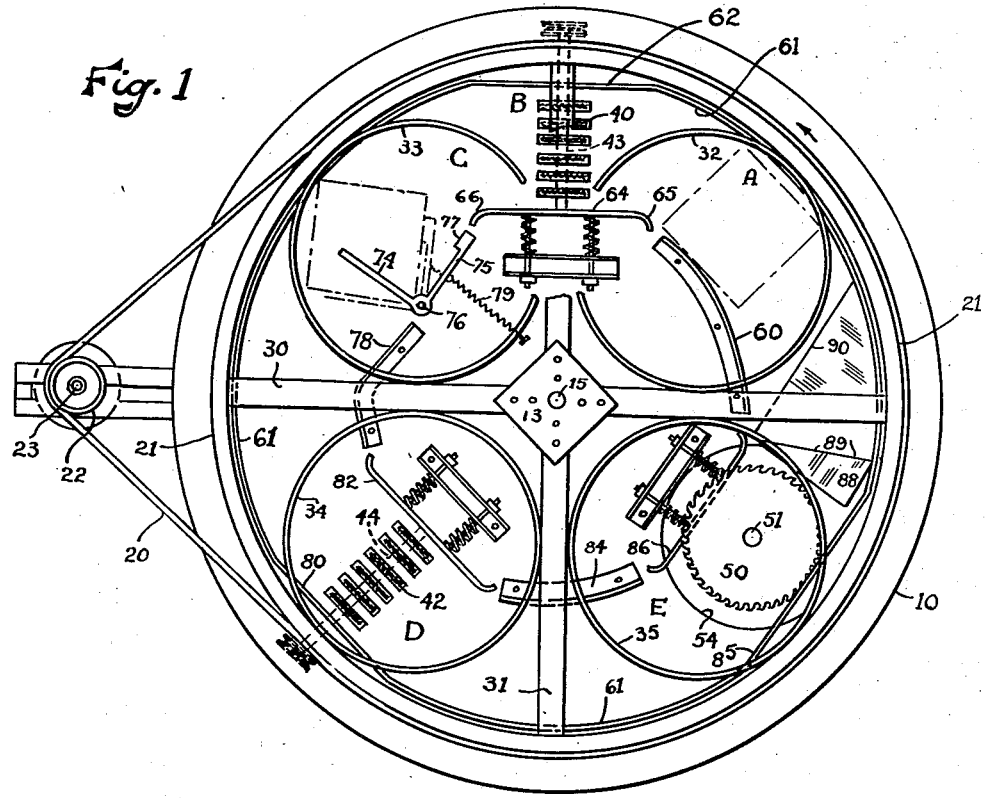
Fig. 1 is a top plan view of the machine.
Figure 2:
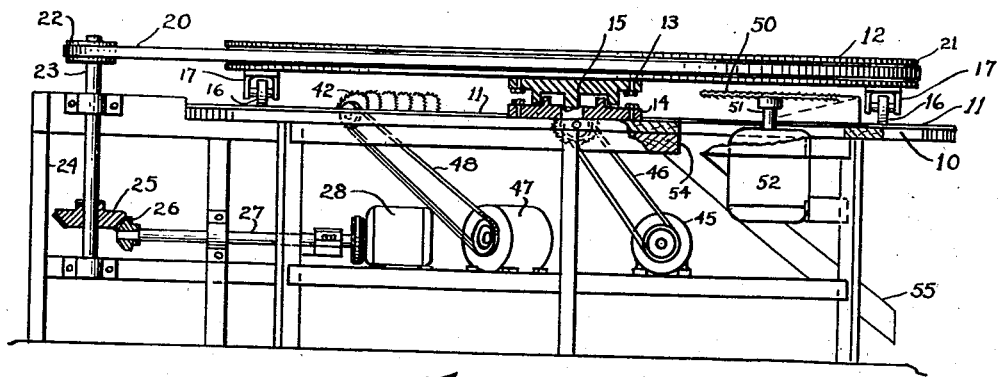
Fig. 2 is a side elevation, partly in section.

Referring first to Figs. 1 and 2, the machine comprises a stationary circular bed or table 10 having a plane topped plate 11 of wood or metal on which the ice cakes are to slide. Above the bed plate, there is rotatably mounted a turntable 12 having a pivotal mount located for centering the turntable relative to the stationary bed. This mount may comprise an upper plate 13 secured on the underside of the turntable and a lower plate 14 mounted on the bed which may have interfitting concentric guides and a central pivot pin 15 so arranged that the turntable may revolve about the axis of the pin. A set of wheels 16 suitably supported in bearing members 17 are mounted near the periphery of the turntable and arranged to roll on the bed plate 11. The turntable may be driven by a belt 20 passing around an annular groove in the peripheral rim 21 of the turntable, and this belt is driven by a pulley 22 mounted on a vertical shaft 23 suitably supported in bearings on the framework 24 of the machine. A bevel gear 25 keyed to the shaft 23 is driven by another gear 26 fixed on the short horizontal shaft 27 suitably mounted in bearings and which in turn is driven by an electric motor 28 mounted on the framework. The characteristics of this motor are such that the table is rotated at a comparatively slow rate, such as one to five revolutions per minute for a table which is substantially six feet in diameter.

The turntable comprises two diametrically arranged cross arms 30 and 31 carrying the pivot plate 13, and these cross arms have mounted thereon in fixed positions the four metal rings 32, 33, 34 and 35. Each of these rings form an open guide frame arranged to slide a cake of ice in a circular path over the table top from one cutting stage to the other as the turntable rotates.

Two spaced sets of parallel gang saws 40 and 42 project upwardly through slots in the bed and are mounted on shafts 43 and 44 which are suitably supported in horizontal bearings carried on the stationary framework of the machine. The shaft 43 is so positioned, as shown in Fig. 1, that a cake of ice may be loaded into the ring 32 of that figure without touching the saws and then be brought into cutting engagement with the first set. The second set of saws 42 may have its shaft 44 arranged at an angle of 120° to shaft 43 or otherwise suitably positioned, but it is preferred to have these so arranged that a cake of ice has had the first set of cuts substantially completed therein by the saws 40 before another cake of ice reaches the second set of cutting saws 42, in order that the load on the table driving motor may be made more uniform.

Each of these sets of saws may be suitably driven, but it is preferred that each have a separate motor which may be separately controlled, so that in the case of any accident or emergency in the ice cutting operation either set of saws may be quickly stopped. This consideration applies also to the other driving motors, each of which is controlled independently of the others. The shaft 43 carrying the saws 40 may be driven by a motor 45 suitably connected by a belt 46 with the shaft. The other set of saws 42 may be driven by a motor 47 connected by a belt 48 with a pulley on the shaft 44. The shafts for these saws are located relative to the top of the plane faced bed plate or table 11 so as to make a cut of the required depth into the underside of the ice cake. For example, if cubes of about two inches on an edge are to be made, then the saw blades will project two inches above the top of the bed plate and each saw is the same height so that the gang of saws will cut parallel grooves of the same depth in the ice cake.

A third saw 50 is mounted on a vertical shaft 51 suitably supported in bearings in the framework and this is rotated by an electric motor 52 at a speed required for the ice cutting operation. The under surface of this saw 50 is spaced above the top of the bed plate 11 by a suitable distance, such as two inches, if two inch cubes are to be cut. Each of the saws has suitable teeth and is rotated in the required direction so as to cut the ice properly. The saw 50 has a diameter preferably greater than that of the width of the ice cake to be cut, and the saw is made of strong material so that it will support the weight of the ice cake during the operation of cutting off the blocks. The bed parts 10 and 11 are cut away adjacent to the horizontal saw 50 to provide an opening 54 through which the severed blocks of ice may fall and thence travel down a chute 55 into a suitable receptacle provided for the purpose.

A primary feature of this invention comprises a structure which makes the machine operate substantially automatically after a cake of ice has been loaded into one of the circular frames. This comprises a set of ribs and movable guide plates so located and arranged as to insure that the ice travels only in a straight line during the first two stage cutting operations and that it is supported against improper movement during each of these cutting stages. The first stage guide comprises a curved flanged or L-shaped member 60 (Fig. 1) mounted on the top of the bed plate 11 in the first zone position A (Fig. 3) where the ice cake is loaded onto the table.

Figure 3:
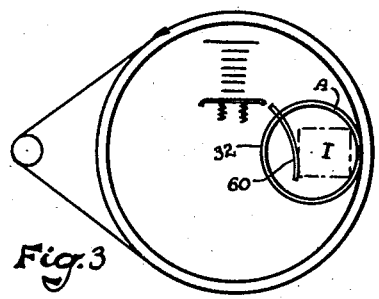
Figs. 3, 4, 5 and 6 are diagrammatic views showing the operation of the machine.

The upstanding rib of this guide 60 is spaced from the outer portion of the ring 32 by a required distance so that the cake of ice may be placed in the opening as indicated in dotted outlines in Figs. 1 and 3. The ice is moved by the revolving ring 32 and caused to travel along the guide plate 60 until it reaches a straight guide 62 similarly secured to the table top and located parallel with the sides of the saws 40. This guide 62 may be a part of rib going all the way around the table, but the connecting portions 61 of this rib may be omitted, if desired. Thus, when the ice cake is moved by the ring 32 in the direction of the arrow, it strikes this straight plate and is caused to assume a rectilinear direction of movement before it contacts with the rotating saws 40 in position B of Fig. 4.

Figure 9:
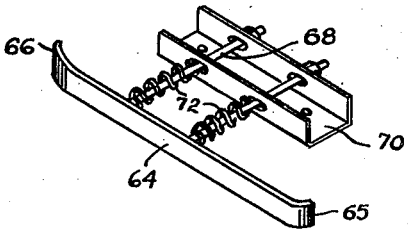
Fig. 9 is an isometric detail of one of the spring pressed guides arranged for holding the cake in proper position for rectilinear travel during one of the cutting operations.

In order to insure that the cake is held squarely against the straight guide 62, a spring pressed guide 64 is provided, and this has its inner surface parallel with the inner surface of the plate 62. It also has entering and exit curved portions 65 and 66. This presser guide 64, as shown in Fig. 9, is carried on two slide rods 68 which are slidably mounted in aligned holes in a channel iron 70 suitably mounted on the top plate 11. Compression springs 72 surround the rods and engage the adjacent surfaces of the guide 64 and the channel iron and thus tend to hold the guide 64 pressed outwardly against the ice cake. Other devices may be used instead of the springs, as will be readily understood, to urge the cake against the stationary guide 62 and cause it to travel in a straight path.

Figure 4:
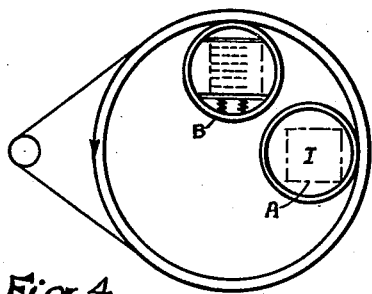

It will, therefore, be seen that when the cake of ice leaves the stationary guide 60 and strikes the curved end 65 of the spring pressed guide 64, the pressure of the springs will force the cake towards the straight guide 62 and cause the cake to be oriented into a position where its side faces are parallel with the two guides 62 and 64, as indicated in Fig. 4. It is to be understood that the cake of ice has been initially provided with substantially parallel flat sides and is shaped as a cube or as a parallelepipedon. Thus, as the turntable moves toward the left in Figs. 1, 3 and 4 the cake of ice I will be forced by the guide plates 62 and 64 to travel in a straight line so that saws 40 cut parallel grooves therein.

Figure 5:
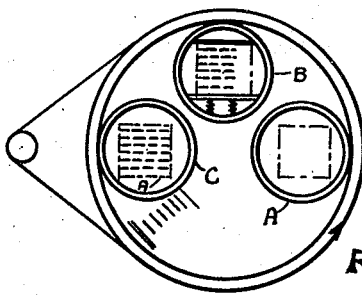
Figure 7:
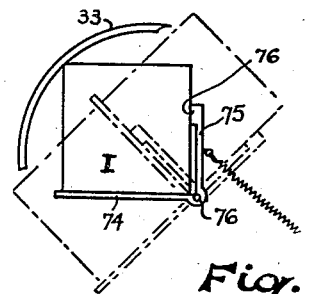
Fig. 7 is a fragmentary top plan view of the ice turning mechanism.
Figure 8:
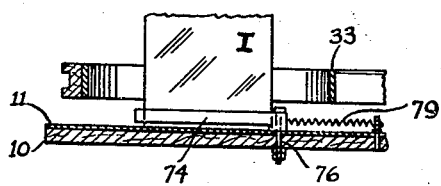
Fig. 8 is a fragmentary side elevation of part of the turntable and ice turning mechanism.

The next step involves turning the ice cake through an angle of 90° in position C of Figs. 1 and 5. This is preferably accomplished by means of the pivotally mounted L-shaped lever (see Figs. 1, 7 and 8) which has arms 74 and 75 arranged at right angles and located close to the table top. They need be no higher than the guide plates.

The lever is mounted at its corner on the vertical pivot 76 suitably fixed on the stationary table top. The lever 75 has a projecting end portion 77 which further aids in turning the ice cake. The pivot 76 is in substantial alignment with the curved exit end 66 of the presser guide 64 and a further stationary guide 78 (Fig. 1) mounted on the top of the table plate 11. A spring 79 tends to pull the L-shaped lever toward the right where it may receive the on-coming ice cake.

Figure 6:
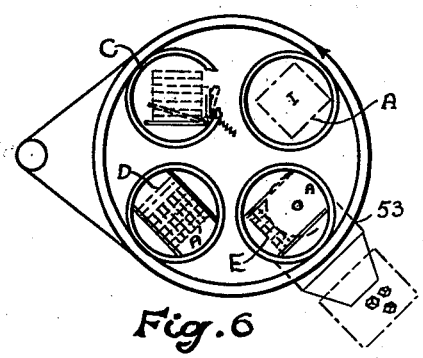

The ice is moved forward into the open 90° angle of this lever, and as the revolving ring pushes the ice forward into contact with the arm 74 that arm swings around toward the stationary guide 78 and causes the arm 75 and its projecting portion 77 to turn the ice cake around into position C (Fig. 5) where it may now be moved into the second set of saws 42 and cut at right angles to the cuts made by the first set of saws 40. The ice is forced by the ring 33 to travel along the stationary curved guide 78 and associated guide parts into position D (Figs. 1 and 6) where it is cut by the knives 42. The pivoted lever 74—75 turns the ice partially, and it is turned the rest of the way by the straight guide plate 80 and a spring pressed guide plate 82 which are constructed and arranged the same as are the guide plates 62 and 64 above described. During the time that the first cake of ice has reached a position where it is ready to enter the last cutting zone of position E, further cakes of ice have been loaded into the rotating turntable in the position of the ring in Fig. 3, and all of the rings are now full of ice so that the operation is thereafter continuous and successive.

The ice leaves the second set of knives 42 and is again forced by a stationary curved guide plate 84 into proper contact with a straight guide bar 85 which cooperates with a third presser guide 86 constructed the same as the guide 64 shown in Fig. 9. Thus, the ice is caused to pass through the last cutting zone (position E of Figs. 1 and 6) where the blocks of ice are now severed from the cake supported on the top of the saw 50. These blocks pass downwardly through the hole 54 beneath the saw 50 and escape from the machine. The cake of ice remaining above the saw now travels over a platform having a triangular portion 88 arranged substantially on the level of the top surface of the saw 50 and a sloping portion which falls away from the edge 89 toward the edge 90 which is at the level of the top surface of the table plate 11 where the cake is now ready to travel through the same cycle of operations and have new sets of right angled cuts made therein and the blocks again sheared by the last saw from the under surface of the cake.

It will now be appreciated in view of the above description of the construction and operation of this machine, that the ice blocks may be severed intermittently from a continuously traveling ice cake and that new cakes of ice may be fed into the starting zone Fig. 3 as frequently as required. Suitable provisions may be made for removing the fine ice particles thrown from the saws, and various expedients may be employed as deemed advisable for supplementing the above described operation. Various mechanical equivalents may be substituted for those above shown, and numerous modifications may be made in the structure within the knowledge of one skilled in this art, in view of the above disclosure. Hence the drawings and specification are to be interpreted as illustrating the general principles of this machine and a preferred embodiment of my invention and without imposing limitations on my invention except as are defined in the claims appended hereto.

I claim:

1. An ice cutting machine comprising a bed having a flat top, a revoluble turntable thereover having a propelling frame fixed thereon and arranged to slide a cake of ice in a substantially circular path over the bed top and permit it to turn within the frame, two spaced sets of saws projecting above the bed top in the path of the cake, the saws in each set having their faces perpendicular to a radius of the turntable and being arranged to cut parallel grooves in the underside of the cake, an L-shaped pivoted guide having its two arms forming a substantially 90° angular space, and means including a fixed support located outside of but close to the path of movement of the ice cake between the sets of saws which pivotally supports said guide at its corner with the arms arranged to receive the moving ice cake therebetween, said guide cooperating with the propelling frame to turn the ice cake within the frame and cause the second set of saws to cut the cake at an angle to the cuts made by the first set.

2. An ice cutting machine comprising a bed having a flat top, a revoluble turntable thereover having a propelling frame fixed thereon and arranged to slide a cake of ice in a substantially circular path over the bed top and permit it to turn within the frame, two spaced sets of saws projecting above the bed top in the path of the cake, the saws in each set having their faces perpendicular to a radius of the turntable and being arranged to cut parallel grooves in the underside of the cake, a horizontal saw spaced above the bed for severing blocks from the previously cut cake, a straight guide at one side of each of the sets of saws and a presser guide on the other side thereof which cooperate to cause the ice cake to move within the propelling frame and travel in a straight path while being cut by each set of saws, an L-shaped pivoted guide having its two arms forming a substantially 90° angular space, and means including a fixed support located outside of but close to the path of movement of the ice cake between the sets of saws which pivotally supports said guide at its corner with the arms arranged to receive the moving ice cake therebetween, said guide cooperating with the propelling frame to turn the ice cake within the frame and cause the second set of saws to cut the cake at an angle to the cuts made by the first set.

3. An ice cutting machine comprising a stationary flat topped bed plate having two spaced straight outer guides, a revoluble turntable pivotally mounted over the bed plate which has an opening materially larger than an ice cake, a propelling member fixed on the turntable and defining a portion of the opening, said propelling member and opening being so arranged that an ice cake projecting through said opening may be slid on the bed plate about the turntable axis and be moved within said opening while it is guided in a straight path by each of said outer guides, two sets of saws projecting above the bed plate, the saws of each set having their faces perpendicular to a radius of the turntable and parallel with one of the outer guides and arranged for cutting parallel grooves in the under side of the ice cake, means including a horizontal saw spaced above the bed plate for severing blocks from the previously grooved ice cake, a spring pressed presser guide arranged to press an ice cake against each straight guide and cause it to move in a straight path as it is being cut by the saws, and an L-shaped pivoted guide having its two arms forming an angular space arranged to receive the ice cake which cooperates with said propelling member to turn the ice cake through an angle of substantially 90° while it travels between the two sets of saws.

MAURICE E. TORPEY.